United States Patent
Khanal (10) Patent No.: US 9,578,055 B1
(45) Date of Patent: Feb. 21, 2017

(54) THWARTING DRONE-WAGED DENIAL OF SERVICE ATTACKS ON A NETWORK

(75) Inventor: Bhushan P. Khanal, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1665 days.

(21) Appl. No.: 12/357,372

(22) Filed: Jan. 21, 2009

Related U.S. Application Data (60) Provisional application No. 61/023,569, filed on Jan. 25, 2008.

(51) Int. Cl.
H04L 29/06 (2006.01)

(52) U.S. Cl.
CPC ....... *H04L 63/1458* (2013.01); *H04L 63/1491* (2013.01)

(58) Field of Classification Search
None
See application file for complete search history.

(56) References Cited

U.S. PATENT DOCUMENTS

| | | | |
|---|---|---|---|
| 5,426,635 A | 6/1995 | Mitra et al. | |
| 5,991,881 A | 11/1999 | Conklin et al. | |
| 6,215,769 B1 | 4/2001 | Ghani et al. | |
| 6,252,851 B1 | 6/2001 | Siu et al. | |
| 6,622,172 B1 | 9/2003 | Tam | |
| 6,741,555 B1 | 5/2004 | Li et al. | |
| 6,789,203 B1* | 9/2004 | Belissent | 726/22 |
| 6,981,014 B2 | 12/2005 | Jayam et al. | |
| 7,369,498 B1 | 5/2008 | Ma et al. | |
| 7,721,091 B2* | 5/2010 | Iyengar et al. | 713/166 |
| 8,379,515 B1 | 2/2013 | Mukerji | |
| 2003/0179720 A1 | 9/2003 | Cuny | |
| 2004/0190449 A1* | 9/2004 | Mannal et al. | 370/229 |
| 2004/0255151 A1* | 12/2004 | Mei et al. | 713/201 |
| 2005/0210122 A1 | 9/2005 | Taylor et al. | |
| 2006/0112174 A1* | 5/2006 | L'Heureux et al. | 709/223 |
| 2007/0192863 A1* | 8/2007 | Kapoor et al. | 726/23 |
| 2007/0297414 A1 | 12/2007 | Gupta et al. | |
| 2010/0274872 A1 | 10/2010 | Harrang et al. | |

OTHER PUBLICATIONS

Robot Wars—How Botnets Work, http://www.windowsecurity.com/articles/Robot-Wars-How-Botnets-Work.html, launched Oct. 20, 2005 (accessed Dec. 15, 2006), 10 pgs.

(Continued)

*Primary Examiner* — Nadia Khoshnoodi
(74) *Attorney, Agent, or Firm* — John W. Branch; Lowe Graham Jones PLLC (57) ABSTRACT

Embodiments are directed towards detecting and thwarting incoming network requests by either throttling and/or redirecting the attack requests towards a honeypot. As network requests are received, TCP segments are examined to identify a presence of attack signatures before returning an ACK. Such attack signatures may identified based on an absence of referrer headers, an invalid cookie, known improper sender addresses, known valid sender addresses, examination of OSI layer 4 and/or above content of a packet, or the like. If an attack is identified, throttling may be employed by responding to the attack requests by dropping and/or rejecting packets within the request, acknowledging the client device's packets at a byte level, modifying a round trip time (RTT) calculation by responding at a defined slowed rate, and/or redirecting client requests to a honeypot.

17 Claims, 4 Drawing Sheets

(56) References Cited

OTHER PUBLICATIONS

White Paper: Application Firewalls, F5 Networks, Inc., Copyrighted Oct. 2007, 7 pgs.
Official Communication for U.S. Appl. No. 13/754,735 mailed Jun. 5, 2013.
Official Communication for U.S. Appl. No. 11/670,410 mailed May 29, 2009.
Official Communication for U.S. Appl. No. 11/670,410 mailed Dec. 30, 2009.
Official Communication for U.S. Appl. No. 11/670,410 mailed Mar. 19, 2010.
Official Communication for U.S. Appl. No. 11/670,410 mailed Sep. 24, 2010.
Official Communication for U.S. Appl. No. 11/670,410 mailed Jan. 21, 2011.
Official Communication for U.S. Appl. No. 11/670,410 mailed Dec. 6, 2011.
Official Communication for U.S. Appl. No. 11/670,410 mailed Jul. 9, 2012.
Official Communication for U.S. Appl. No. 11/670,410 mailed Oct. 12, 2012.
"Transmission Control Protocol—Darpa Internet Program Protocol Specification", Sep. 1981, pp. 1-90, Information Sciences Institute, Marina del Rey, California, http://tools.ietf.org/html/rfc793 (accessed Jan. 23, 2013).
Rarnakrishnan, et al., :The Addition of Explicit Congestion Notification (ECN) to IP, Sep. 2001, pp. 1-52, Netowrk Working Group, http://www.apps.ietf.org/rfc/rfc3168.html (accessed Jan. 23, 2013).
Stevens, "TCP Slow Start, Congestion Avoidance, Fast Retransmit, and Fast Recovery Algorithms", Jan. 1997, pp. 1-5, Network Working Group, http://www.apps.ietf.org/rfc/rfc2001.html (accessed Jan. 23, 2013).

\* cited by examiner

THWARTING DRONE-WAGED DENIAL OF SERVICE ATTACKS ON A NETWORK

CROSS-REFERENCE TO RELATED APPLICATIONS

This application claims the benefit of U.S. Provisional Application Ser. No. 61/023,569 entitled "Thwarting Drone-Waged Denial Of Service Attacks On A Network," filed on Jan. 25, 2008, the benefit of the earlier filing date of which is hereby claimed under 35 U.S.C. §119 (e) and which is further incorporated herein by reference.

TECHNICAL FIELD

Various embodiments relate generally to network communications, and more particularly, but not exclusively, to examining network packet segments of requests to identify denial of service attacks and/or other network attacks, and to throttle identified attacks and/or redirect the attack requests.

BACKGROUND

Today, increasing numbers of businesses are migrating their applications, and sometimes even their data to the web. Unfortunately, such migrations expose more of their sensitive data and applications to hackers. One common approach used by hackers to attack a business employs botnets.

Briefly, a bot is an abbreviation of the word "robot." Robots typically are computer programs that are configured to perform actions on behalf of a remote user. When a number of these bots are connected to a single channel and receive commands from the remote user, they form what is known as a botnet.

Botnets and drones have become common household names lately as a result of computing security related vulnerabilities, which are often exploited by opportunistic, malicious attackers. Traditional network devices such as firewalls, proxy servers, and the like, are becoming less effective disrupting these kinds of attacks using conventional defenses. Methods that may have once been effective in disrupting these sorts of attacks, such as targeting synchronization (SYN) floods at the sites waging the attacks, are becoming less effective to botnet attacks. Moreover, many of the attackers appear to be targeting the most vulnerable or weakest points in a business' network. These weakest points typically involve computing devices configured with processing intensive applications. Because traditional approaches have found it difficult to distinguish between legitimate database operations from unauthorized database operations, these applications and their data remain exposed to attacks. Therefore, it is with respect to these considerations and others that aspects of the current invention are directed.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description of the Invention, which is to be read in association with the accompanying drawings, wherein.

DETAILED DESCRIPTION OF THE INVENTION

Various aspects now will be described more fully hereinafter with reference to the accompanying drawings, which form a part hereof, and which show, by way of illustration, specific embodiments by which aspects of the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, aspects of the invention may be embodied as methods or devices. Accordingly, aspects of the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection may be a Transmission Control Protocol/Internet Protocol (TCP/IP) connection. TCP/IP connections are virtual connections between two network nodes, and are typically established through a TCP/IP handshake protocol. The TCP/IP protocol is described in more detail in Request for Comments (RFC) 793, and/or RFC 1323, which are available through the Internet Engineering Task Force (IETF), and are each herein incorporated by reference.

TCP describes what is sometimes referred to a TCP handshake that is often used to enable a client device to request a connection with a server device. The handshake is sometimes also referred to as a 3-way handshake or a "SYN-SYN-ACK." The handshake typically begins with a synchronize (SYN) packet being sent by the client device to the server. When the server receives the SYN packet, it typically responds with a synchronization-acknowledgement packet called a SYN-ACK. Moreover, as part of its actions, the server may reserve resources, including a connection resource for the requesting client. If the client device subsequently sends an ACK packet, the connection is then established between the client device and the server device. The devices may then communicate over the connection. If, however, the server device does not receive the ACK packet, the server device may continue to keep the resources reserved for the client device for a period of time, resend the SYN-ACK, or perform other actions directed to preserving the reserved resources for the requesting client device.

As used herein the term "denial of service (DoS) attack" refers to a network attempt directed towards rendering a computer resource unavailable by overwhelming the resource with requests. A typical DoS attack involves sending over the network a large quantity of requests to the computing resource in a very short period of time interval in what is known as a network traffic storm to intentionally cause disruptions in the computer resource's communications. There are a variety of mechanisms used to overwhelm a computer resource on the network using DoS attacks, including, but not limited to reflected floods, amplification attacks, and malformed TCP/IP packets.

As used herein, the term "SYN flood attack" refers to sending to an identified computing resource a large number of TCP/SYN packets within a very short period of time interval with the intent of rendering the resource unavailable. Often the TCP/SYN packets include a forged sender address. Each of these packets are handled as a typical connection request, as described above, causing the server device to spawn a half-open connection that is reserved for the requesting device. However, because the sender address may be forged, the response never comes, leaving the server device with dead connections. These half-open, reserved connections consume resources on the server device and limit the number of valid connections the server device is able to make; at least until the attack ends or other corrective actions are taken. As more invalid requests are received, more resources are reserved, and, if the attacker is successful, eventually, all of the connection resources of the server device are improperly reserved and no longer available for valid connections.

As used herein, the term "honeypot" refers to a network device, application, or other network resource that is configured to detect and/or deflect or in some other manner counteract an attempt at unauthorized use of a network resource. Typically, a honeypot appears to be part of a network with resources that may be desirable to a hacker, but may actually be isolated from the network and/or resources being protected and are often without desirable resources.

Briefly, various aspects are directed towards at least systems, processor readable storage mediums, and methods for detecting and thwarting incoming network requests by either throttling the requests and/or redirecting the attack requests towards a honeypot. In one embodiment, throttling of the attack request may include imparting a small delay on the requester's side. In one embodiment, as network requests are received, TCP packet segments are examined to identify a presence of attack signatures. Such attack signatures may be identified based on a variety of information, including but not limited to an absence of referrer headers, an invalid cookie, known improper sender addresses, known valid sender addresses, or the like. In one embodiment, the examination might include examination of Open System Interconnection (OSI) layer 4 and/or above content and/or headers of a packet to identify potential attacks. For example, the content/headers may be examined to determine if proper values, names of parameters, or the like, are included in the request. In one embodiment, flows of an interaction with a client device might be examined to determine whether the requests can be identified as part of an attack. In any event, once an attack is identified, throttling may be employed by responding to the attack requests in ways that are directed at making it more difficult for the attacker. Any of a variety of mechanisms may be used to throttle the requests, including, but not limited to dropping and/or rejecting packets within the request, thereby forcing the client device to resend the packets. Another approach includes acknowledging the client device's packets at a byte level, such as a byte at a time. Still another approach includes modifying a round trip time (RTT) calculation, by responding at a defined slowed rate. It should be noted that other approaches to throttling the client device's requests are also envisaged, including combining one or more of the above approaches. In still another approach, or in addition to the above approaches, the client device's attack requests may be redirected to a honeypot that may be configured to send expected responses to the attacking client device on behalf of the intended target, but to have no significant resources exposed to the hacker.

Illustrative Operating Environment

Figure 1:
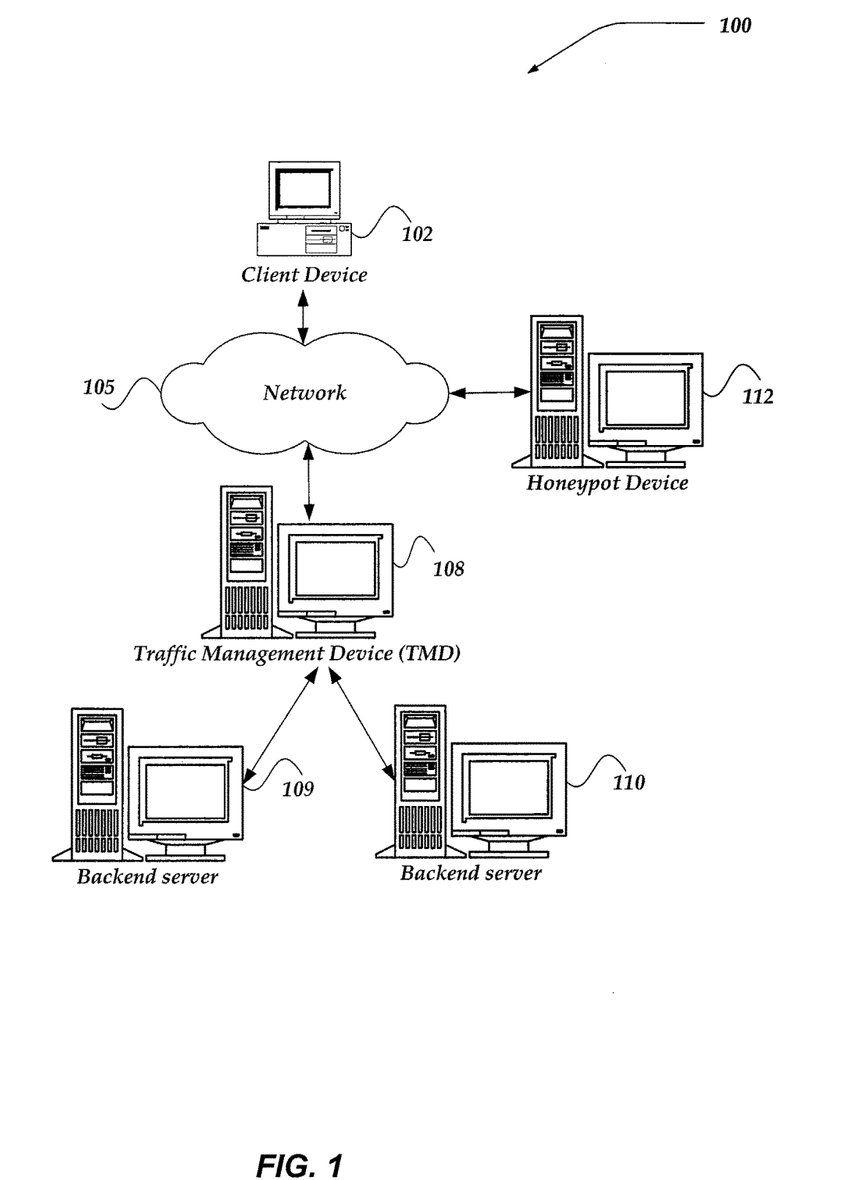
FIG. 1 shows a block diagram illustrating an environment for practicing various aspects.

FIG. 1 illustrates one embodiment of an environment in which various aspects of the invention may operate. However, not all of these components may be required, and variations in the arrangement and type of the components may be made.

As shown in the figure, system 100 includes client device 102, Traffic Management Device (TMD) 108, backend servers 109-110, honeypot device 112, and network 105. Client device 102 is in communication with TMD 108 through network 105. TMD 108 is also in communication with backend servers 109-110 and honeypot device 112. Although not illustrated, a network similar to network 105 may reside between TMD 108 and backend servers 109-110.

Generally, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network devices, and the like. As such, client device 102 may range widely in terms of capabilities and features. For example, a client device configured as a cell phone may have a numeric keypad and a few lines of monochrome LCD display on which only text may be displayed.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), internet relay chat (IRC), mIRC, Jabber, and the like, between another computing device, and the like.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

In one embodiment, client device 102 may be configured such that an end-user may operate the computing device to make requests for data and/or services from other computers on the network. In one embodiment, client device 102 might make a legitimate request for content and/or services. However, in another embodiment, client device 102 might be involved directly or indirectly in a denial of service attack upon backend servers 109-110 TMD 108, or the like. As such, in one embodiment, client device 102 (and/or a plurality of other client devices not illustrated) might send a plurality of requests to TMD 108 to for content and/or services.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media may embody computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment, of TMD 108 is described in more detail below in conjunction with FIG. 2. Briefly, however, TMD 108 may include virtually any device that manages network traffic. Such devices include, for example, routers, proxies, firewalls, load balancers, cache devices, devices that perform network address translation, any combination of the preceding devices, and the like. TMD 108 may, for example, control the flow of data packets delivered to and forwarded from an array of servers, such as backend servers 109-110. TMD 108 may direct a request to a particular server based on network traffic, network topology, capacity of a server, content requested, and a host of other traffic distribution mechanisms. TMD 108 may receive data packets from and transmit data packets to the Internet, an intranet, or a local area network accessible through another network. TMD 108 may recognize packets that are part of the same communication, flow, and/or stream and may perform special processing on such packets, such as directing them to the same server so that state information is maintained. TMD 108 also may support a wide variety of network applications such as web browsing, email, telephony, streaming multimedia and other traffic that is sent in packets to and/or from backend servers 109-110, client device 102, or the like. The BIG-IP® family of traffic managers, by F5 Networks Inc. of Seattle, Wash., are one example of TMDs. Moreover, TMDs are described in more detail in U.S. Pat. No. 7,102,996 to Amdahl, et al. entitled "Method and System for Scaling Network Traffic Managers," which is incorporated herein by reference.

TMD 108 may receive a request from client device 102, or the like, for content and/or a service. TMD 108 may select a server from backend servers 109-110 to forward the request. TMD 108 may employ any of a variety of criteria and mechanisms to select the server, including those mentioned above, load balancing mechanisms, or the like. TMD 108 is further configured to receive a response to the request from backend servers 109-110 and to forward the response to client device 102, or the like.

TMD 108 may be further configured to examine the request from client device 102, or the like, and determine whether the request is associated with a network attack, such as a denial of service attack, or the like. In one embodiment, TMD 108 might select to examine each request to determine if it may be associated with a network attack, while in another embodiment, TMD 108 might selectively examine requests based on various criteria. For example, TMD 108 might select to examine requests that are associated with OSI layer 4 or above requests, requests that are being sent towards a known weak target network device behind TMD 108, or virtually any other criteria.

TMD 108 might selectively examine, in one embodiment, initial TCP segments of an incoming network request to identify an attack. In one embodiment, TMD 108 might do so by looking for various attack characteristics or signatures before responding to the request. TMD 108 might examine, for example, the request to determine if there is an absence of a referrer header, an invalid cookie, or virtually any other characteristic. For example, TMD 108 might look for requests from known suspect sources, known good sources, or the like. TMD 108 may also employ a mechanism that enables examination of various portions of the packet, such as whether the request includes layer 4 or above requests. For example, TMD 108 might examine the packet to determine whether the request includes or fails to include parameters that should or must appear in a properly formed request to a resource. TMD 108 might further examine the packets at layer 4 or above to determine whether characteristics of various values within a parameter are allowable for a give request. TMD 108 is not limited to these mechanisms for detecting an attack, and virtually any other mechanism may also be used. For example, TMD 108 may monitor states of actions from a client device to determine whether a request or action is allowable given a particular context of the request. For example, a request may be considered to be perfectly legitimate within one context, while the same request may be considered inappropriate from the client device within another context. Moreover, if TMD 108 detects a request that may be associated with an attack, TMD 108 may perform various responses that are directed towards artificially forcing the requesting device to throttle or slow down its request, without generating definable significant network congestion. By imparting relatively small delays on the requesting device's side substantial benefits in protecting resources from the attack may be realized. In one embodiment, the throttling mechanisms selected may be selected to minimize a likelihood that the requesting device will detect and/or avoid the throttling. Thus, in one embodiment, one or more throttling mechanisms may be used for one time period, and a different one or more throttling mechanisms used at another time period. Moreover, in one embodiment, TMD 108 may select instead of or in addition to throttling of the response to the request, to redirect the request to another network device, such as honeypot device 112. Redirection of the request is directed towards overloading the request to a 'sacrificial' network device, thereby reducing a likelihood that the TMD and/or backend servers are rendered unavailable due to the attack. In one embodiment, TMD 108 may employ processes substantially similar to those described below in conjunction with FIGS. 3-4 to perform at least some of its actions.

Honeypot device 112 includes virtually any network device, application, or other network resource that is configured to detect and/or deflect or in some other manner counteract an attempt at unauthorized use of a network resource. Honeypot device 112 may, in one embodiment, appear to be part of a network with resources that may be desirable to a hacker, but may actually be isolated from the network and/or resources being protected, often without desirable resources. In one embodiment, honeypot device 112 may be configured to provide specified responses to requests in a manner that may confuse or thwart an attack, without providing information that may be used by the attacker to determine that responses are being sent by a honeypot device.

Backend servers 109-110 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by backend servers 109-110 may be formatted according to TCP/IP, but they could also be formatted using another transport protocol, such as SCTP, UDP, NetBEUI, IPX/SPX, token ring, similar IPv4/6 protocols, and the like. Moreover, the packets may be communicated between backend servers 109-110, TMD 108, and/or client device 102 employing HTTP, HTTPS, RTSP, or any of a variety of current or later developed protocols.

In one embodiment, backend servers 109-110 may be configured to operate as website servers. However, backend servers 109-110 are not limited to web server devices, and may also operate as messaging servers, File Transfer Protocol (FTP) servers, database servers, content servers, or the like. Additionally, each of backend servers 109-110 may be configured to perform a different operation. Thus, for example, backend server 109 may be configured as a messaging server, while backend server 110 may be configured as a database server. Moreover, while backend servers 109-110 may operate as other than a website, they may still be enabled to receive an HTTP communication, as well as a variety of other communication protocols.

Devices that may operate as TMD 108, honeypot device 112, and/or backend servers 109-110 include but are not limited to personal computers, desktop computers, multiprocessor systems, microprocessor-based or programmable consumer electronics, network PCs, servers, or the like.

Illustrative Network Device

Figure 2:
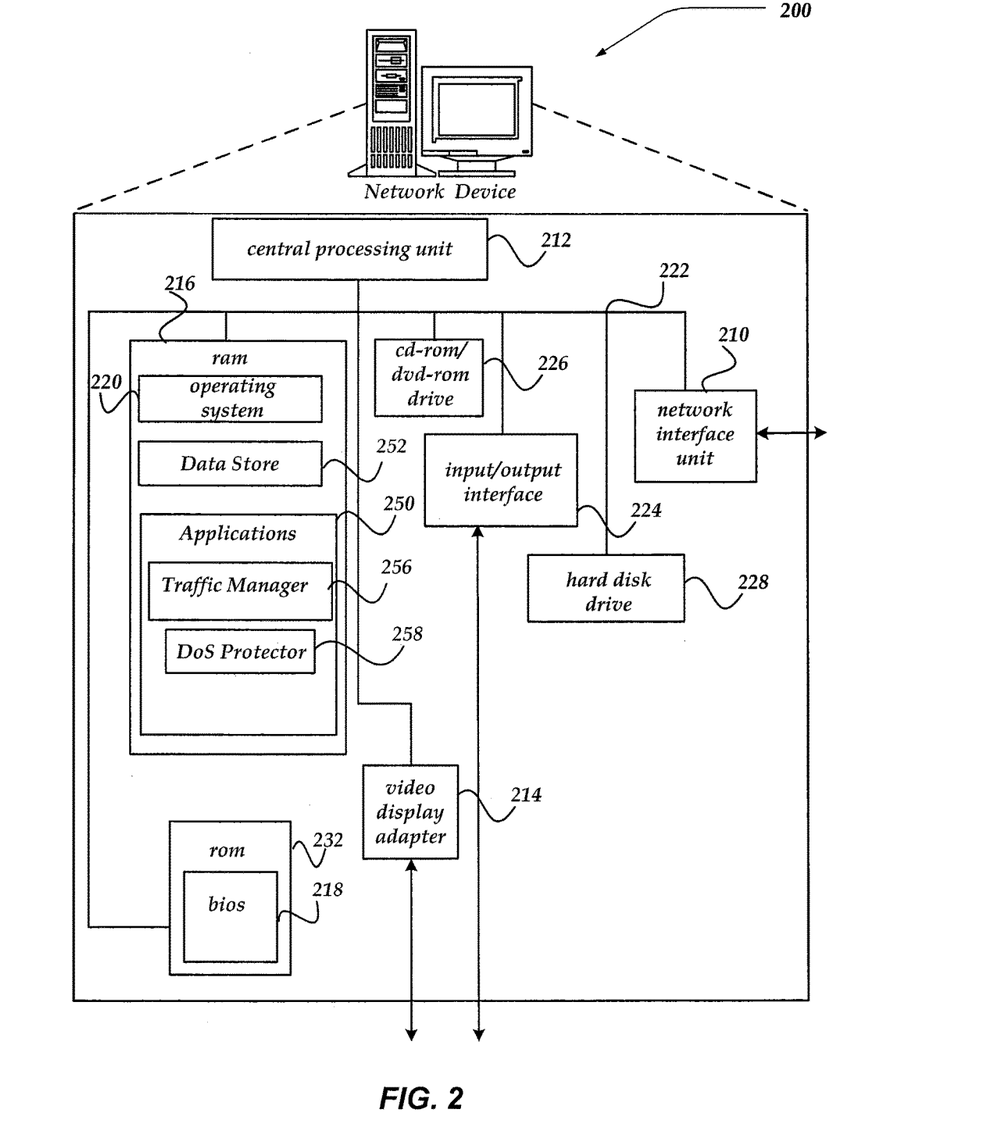
FIG. 2 illustrates one embodiment of a network device for within FIG. 1.

FIG. 2 shows one embodiment of a network device, according to one embodiment. Network device 200 may include many more or less components than those shown. The components shown, however, are sufficient to disclose an illustrative embodiment for practicing one or more embodiments. Network device 200 may represent, for example, TMD 108 of FIG. 1.

Network device 200 includes at least one processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

The mass memory 216, 226, 228, and 232 described herein and shown in FIG. 2 illustrates another type of computer-readable media, namely computer readable or processor readable storage media. Computer readable storage media may include volatile, nonvolatile, removable, and non-removable media implemented in any method or technology for storage of information, such as computer readable instructions, data structures, program modules, or other data, which may be obtained and/or executed by at least one processing unit 212 to perform one or more portions of process 300 FIG. 3, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer executable instructions, and which can be accessed by a computing device.

The mass memory may also store other types of program code and data as applications 250, which may be are loaded into mass memory and run on operating system 220. Examples of application 250 may include email client/server programs, routing programs, schedulers, web servers, calendars, database programs, word processing programs, HTTP programs, RTSP programs, security programs, and any other type of application program. Applications 250 may also include traffic manager 256 and DoS protector 258. In one embodiment, ram 216 may include data store 252; however, data store 252 may also reside completely, or in part, in another mass memory storage media, including, but not limited to a storage device readable by cd-rom/dvd-rom drive 226, on hard disk drive 228, or even on a computer readable storage medium on another network device and possibly accessible by network device 200 through such as network interface unit 210.

Data store 252 may include virtually any mechanism configured and arranged to store data and/or computer readable instructions. As such, data store 252 may include rules, policies, tracked history, positive signature information, negative signature information, and/or other information useable to detect a network attack.

Traffic manager 256 is configured and arranged to include any component configured to receive a request for a content and/or services and to select and to provide the request to a backend server based on any of a plurality of load-balancing metrics, including network traffic, network topology, capacity of a server, characteristic of the request, a round-robin metric, a domain name requested, or the like.

In one embodiment, traffic manager 256 might employ DoS protector 258 to monitor network traffic to detect and respond to possible network attacks. Thus, in one embodiment, DoS protector 258 may be configured and arranged to identify possible attack behavior, and throttle and/or redirect detected attacks. DoS protector 258 may monitor for any of a variety of attacks including but not limited to bot attacks, botnet attacks, SYN flood attacks, or the like. Thus, DoS protector 258 is not constrained to monitoring for a particular type of improper, unauthorized activity, and other attacks, activities, or the like, may also be detected and thwarted by DoS protector 258. DoS protector 258 may also employ processes such as described below, in conjunction with FIGS. 3-4 to perform at least some of its actions.

Network device 200 may also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like.

Network device 200 may also include input/output interface 224 for communicating with external devices, such as a mouse, keyboard, scanner, or other input/output devices not shown in FIG. 2. Likewise, network device 200 may further include additional mass storage facilities such as cd-rom/dvd-rom drive 226 and hard disk drive 228. Hard disk drive 228 may be utilized to store, among other things, application programs, databases, and the like in the same manner as the other mass memory components described above.

In one embodiment, the network device 200 may include at least one Application Specific Integrated Circuit (ASIC) chip (not shown) coupled to bus 222. The ASIC chip can include logic that performs some or all of the actions of network device 200. For example, in one embodiment, the ASIC chip can perform a number of packet processing functions for incoming and/or outgoing packets. In one embodiment, the ASIC chip can perform at least a portion of the logic to enable the operation of traffic manager 256, DoS protector 258, or any other components.

In one embodiment, network device 200 can further include one or more field-programmable gate arrays (FPGA) (not shown), instead of, or in addition to, the ASIC chip. A number of functions of network device 200 can be performed by the ASIC chip, the FPGA, by CPU 212 with instructions stored in memory, or by any combination of the ASIC chip, FPGA, and a CPU.

Generalized Operation

Figure 3:
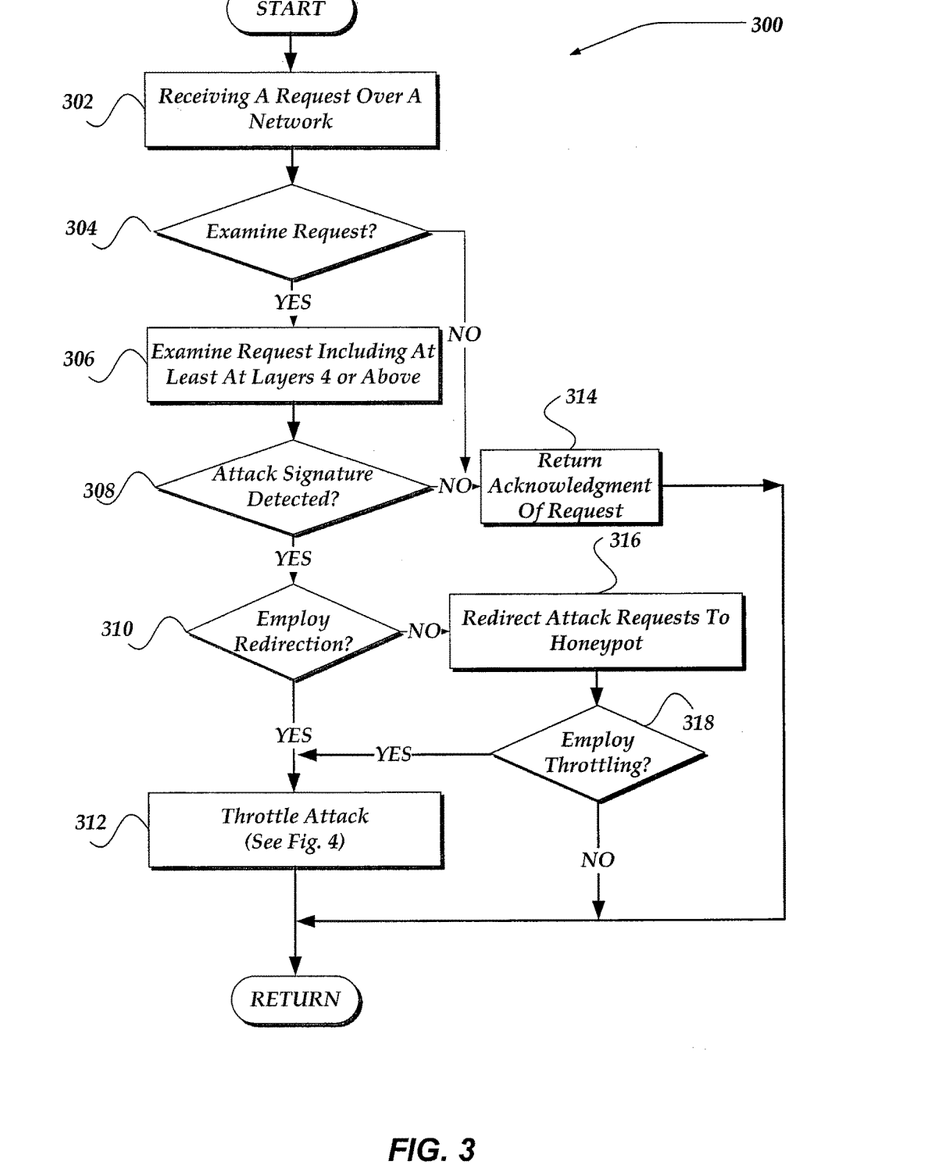
FIG. 3 illustrates a logical flow diagram generally showing one embodiment of a process for detecting and throttling and/or redirecting attacks over a network.

The operation of certain aspects will now be described with respect to FIGS. 3-4. FIG. 3 illustrates a logical flow diagram generally showing one embodiment of a process for detecting and throttling and/or redirecting attacks over a network. Process 300 of FIG. 3 may be implemented within TMD 108 of FIG. 1, for example.

Process 300 begins, after a start block, at block 302, where a request for content or resource is received over a network. Processing moves next to decision block 304 where a determination is made whether to examine the request. As stated above, in one embodiment, each request may be examined. However, in another embodiment, requests may be examined based on a variety of criteria, including, but not limited to an origin of the request, a destination of the request, whether an attack is currently detected, a type of request, or any of a number of other criteria. If the request is to be examined, processing flows to block 306; otherwise, processing branches to block 314.

At block 306, the request is examined to attempt to detect whether it is associated with an attack on a network resource. As noted above, the examination may include, looking for various attack characteristics or signatures. In one embodiment, the examination might be of an initial packet segment within the request. In one embodiment, examination might include determining whether the request includes a referrer head, an invalid cookie, or virtually any other characteristic. Examination might further include looking at the request to determine if it is from a known suspect source, known good source, or the like. Examination may also include examining various other portions of a packet associated with the request, such as whether the request includes layer 4 or above requests. For example, examination may be of the packet to determine whether the request includes or fails to include parameters that should or must appear in a properly formed request to a resource, and/or whether characteristics of various values within a parameter are allowable for a give request. The invention is not limited to these mechanisms for detecting an attack, and virtually any other mechanism may also be used. In any event, processing flows next to decision block 308

At decision block 308, a determination is made whether an attack signature (such as various actions, behaviors, or other information) is detected. If so, processing flows to decision block 310; otherwise, processing flows to block 316.

At decision block 310, a determination is made whether to employ redirection to thwart the detected attack. If so, processing flows to block 316; otherwise, processing continues to block 312.

One embodiment of block 312 is described in more detail below in conjunction with FIG. 4. Briefly, however, at block 312, any of a variety of mechanisms is employed to force the attacker's network stack within the attacking network device to throttle its attack. Thus, in one embodiment, actions are taken that are directed towards inducing actions by the attacking device to slow its activities. Processing then returns to a calling process to perform other actions.

At block 314, it was determined that either no examination of the request is to be performed, or that upon examination no attack is detected. Thus, at block 314, a standard response to the request may be performed, including, but not limited to providing an acknowledgement of the request, allocating network resources to open and reserve a network connection, forward the response to a backend server, or the like. Processing then returns to the calling process to perform other actions.

At block 310, it was determined that at least one response to the detected attack is to redirect the attacker's activities. Thus, processing flows to block 316, where a redirect response might be provided to attacking network device to redirect its actions to a honeypot device that is configured to absorb and control attacks. Processing then continues to decision block 318, where a determination is made whether to also employ throttling. If so, processing flows to block 312 to perform actions as described above; otherwise, processing may return to the calling process to perform other actions.

Figure 4:
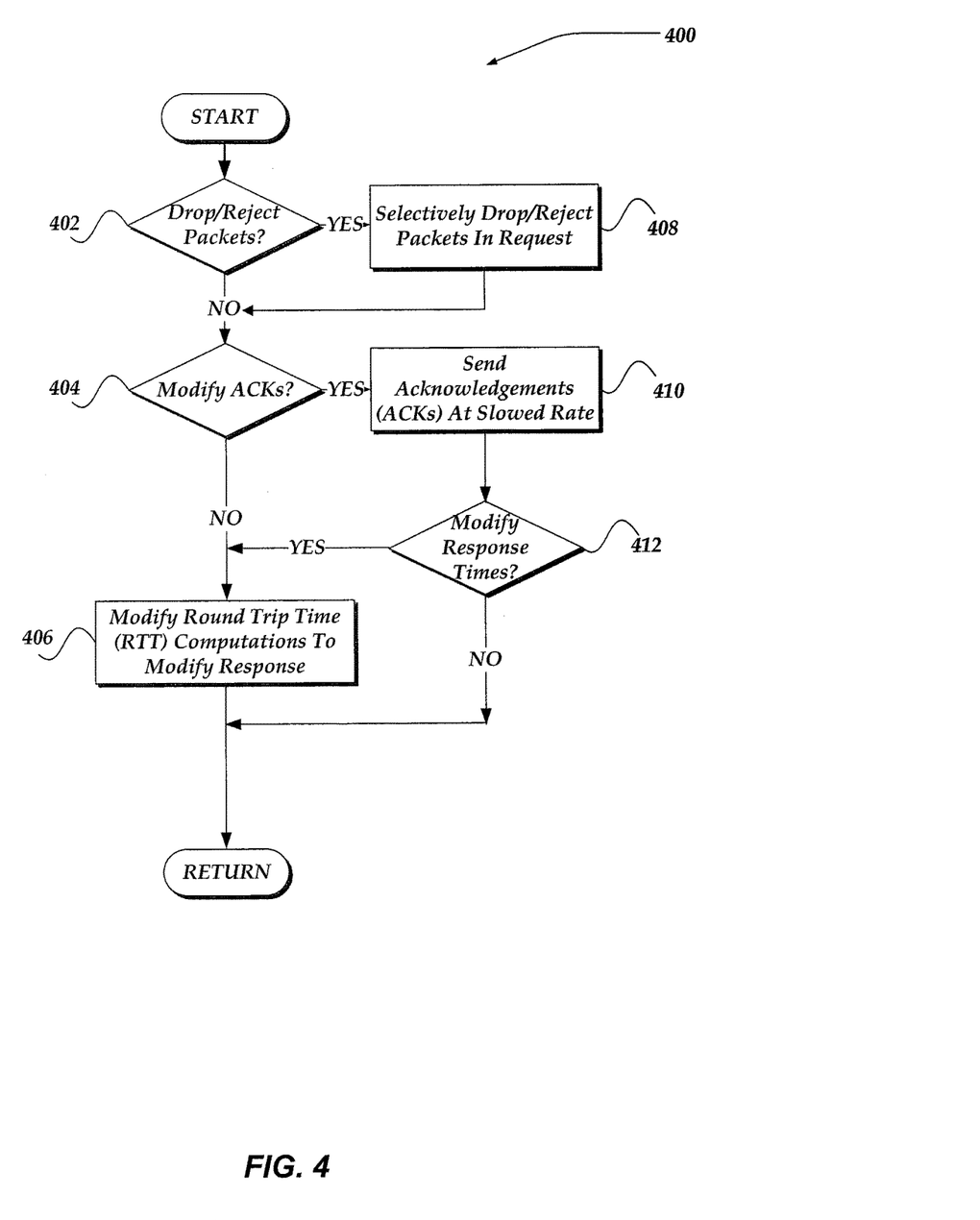
FIG. 4 illustrates a logical flow diagram generally showing one embodiment of a process for selectively throttling an attack of a network device.

FIG. 4 illustrates a logical flow diagram generally showing one embodiment of a process for selectively throttling an attack of a network device. Process 400 of FIG. 4 may be used as one embodiment of block 312 of FIG. 3 described above. However, the invention is not so limited and other embodiments may also be used.

Process 400 may begin, after a start block, at decision block 402, where a determination is made whether to selectively drop/reject packets in the request. If so, processing flows to block 408; otherwise processing continues to decision block 404.

At block 408, selectively dropping and/or rejecting packets is performed. Dropping and/or rejecting packets is directed towards inducing the requesting device to retransmit packets. In one embodiment, dropping and/or rejecting packets may further induce the requesting device to slow its response rate as well, thereby throttling the actions of the requesting device. In one embodiment, dropping and/or rejecting of packets may be based on a random number of drops and/or rejections, based on a slowly varying number of drops/rejections, or based on any of a variety of other schemes. It may be desirable to create a condition with requesting device that continues to maintain the connection at a level such that the requesting device does not suspect being thwarted in its attack. Thus, in one embodiment, at least some information might continue to be sent back to the requesting device, directed towards disguising the thwart response. In any event, processing flows next to decision block 404.

At decision block 404, a determination is made whether to modify the sending of acknowledgements to the requesting device. If so, processing flows to block 410; otherwise, processing continues to block 406.

At block 410, acknowledgements may be sent to the requesting device using any of a variety of mechanisms. For example, in one embodiment, the acknowledgments (ACKs) may be selectively delayed based on some time period. In one embodiment, to minimize likelihood of timeouts, acknowledgements (ACKs) might be delayed but within a timeout period for the connection. For example, in one embodiment, ACKs might be sent at or below a retransmission timeout (RTO) threshold value. In another embodiment, ACKs may be sent a byte at a time to further throttle the requesting device. Processing may then flow to decision block 412.

At decision block 412 a determination is made whether to modify a round trip time (RTT) computation for the connection with the requesting device. If so, processing flows to block 406; otherwise, processing returns to a calling process to perform other actions.

At block 406, a RTT for the connection may be modified using any of a number of mechanisms. For example, in one embodiment, a response to the request may be throttled back to force the requesting device to in turn reduce its rate of transmission, and thereby result in a different RTT for the connection. Processing may then return to the calling process to perform other actions.

The above process should not be construed as the only mechanisms useable to throttle a requesting device, and any of a variety of other mechanisms may be used. For example, in one embodiment, an explicit congestion notification echo (ECE) may be sent to the requesting device to force a change in the requesting device's rate of transmission of packets.

Briefly, an ECE is a flag within a TCP/IP header that may be employed to inform a data sending computing device that a Congestion Experienced (CE) packet has been received. ECE flags are employed within the Explicit Congestion Notification (ECN) protocol and are described in more detail in RFC 3168, which is available through the Internet Engineering Task Force (IETF), and which is incorporated herein by reference. In one embodiment, the TCP protocol is configured to treat an ECN signal the same as when a single dropped network packet is detected, although the packet might not actually be dropped. That is, in one embodiment, the requesting device may reduce its congestion window size (described in more detail in RFC 2001, which is incorporated herein by reference). This in turn may then throttle the requesting device, by forcing it to change its rate of transmission of packets. Other approaches are also envisaged and useable to throttle the attacking network device and thereby thwart the attack.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a resource request over a network, comprising:
   a memory arranged to store data and instructions;
   an input interface for receiving requests and sending responses; and
   a processor arranged to enable actions embodied by at least a portion of the stored instructions, the actions comprising:
      receiving a request from a requesting device over the network for access to a resource;
      selectively examining the request to determine whether it is associated with a network attack; and
      when the request is associated with a network attack, then performing at least one action that is directed towards thwarting the attack by at least:
         providing a redirection response to the request to redirect the requesting device to a honeypot device that is configured to absorb attacks; and
         performing actions directed towards throttling communications with the client device, including:
            selectively inducing the requesting device associated with the request to throttle its communications with the network device by selectively sending delayed acknowledgements to requests from the requesting device;
            dropping or rejecting packets within the request to force the client device to resend the dropped or rejected packets; and
            acknowledging the client device's packets one byte at a time.

2. The network device of claim 1, wherein selectively examining the request further comprises examining the request for an action, behavior, and/or content indicating an attack, wherein the action, behavior, and/or content further comprises at least one of monitoring for an absence of a proper referrer header, a presence of an invalid cookie, or a positive or negative signature associated with the requesting device.

3. The network device of claim 1, wherein sending delayed acknowledgements further comprises sending an acknowledgement at or below a retransmission timeout threshold value.

4. The network device of claim 1, wherein if the request is associated with a network attack further sending an explicit congestion notification echo to the requesting device.

5. A non-transitory machine-readable storage medium having machine-executable instructions stored thereon, which when executed by at least one processor, causes the at least one processor to perform one or more actions to manage a request for a resource, comprising:
   receiving the request from a client device for the resource;
   selectively examining the request to determine whether it is associated with a network attack based in part on an examination of at least an Open System Interconnection (OSI) layer 4 or above network packet characteristic; and
   when the request is determined to be an attack, then:
      providing a redirection response to the request to redirect the requesting device to a honeypot device that is configured to absorb attacks; and
      performing actions directed towards throttling communications with the client device, including:
         selectively sending delayed acknowledgements to requests from the requesting device;
         dropping or rejecting packets within the request to force the client device to resend the dropped or rejected packets; and
         acknowledging the client device's packets one byte at a time.

6. The non-transitory machine-readable storage medium of claim 5, wherein throttling communications further comprises sending an acknowledgement at or below a retransmission timeout threshold value.

7. The non-transitory machine-readable storage medium of claim 5, wherein throttling communications further comprises sending an explicit congestion notification echo message to the client device.

8. The non-transitory machine-readable storage medium of claim 5, wherein selectively examining the request further comprises examining the request for at least one of an absence of a proper referrer header, an absence of defined parameters in the request, or improper values within a parameter within the request.

9. A traffic manager device for managing a request for a resource over a network, comprising:
   a transceiver that is configured to receive requests and to send responses; and
   a processor arranged to enable actions comprising:
      receiving a request from a requesting device over the network for access to a resource;
      selectively examining the request to determine whether it is associated with a network attack; and
      based on the request being determined to be associated with a network attack, then:
         providing a redirection response to the request to redirect the requesting device to a honeypot device that is configured to absorb attacks; and
         performing actions directed towards throttling communications with the client device, including:
            selectively inducing the requesting device associated with the request to throttle its communications with the network device by selectively sending delayed acknowledgements to requests from the requesting device;
            dropping or rejecting packets within the request to force the client device to resend the dropped or rejected packets; and
            acknowledging the client device's packets one byte at a time.

10. The traffic manager device of claim 9, wherein the honeypot device is configured and arranged to further throttle the communications with the requesting device.

11. The traffic manager device of claim 9, wherein selectively examining the request further comprises examining the request if an attack is currently detected.

12. The traffic manager device of claim 9, wherein selectively examining the request further comprises examining the request to identify at least one of an improper parameter within the request or absent from the request, or an improper value within a parameter within the request.

13. The traffic manager device of claim 9, wherein throttling the communications further comprises sending an acknowledgement at or below a retransmission timeout threshold value.

14. A system for managing a request for a resource, comprising:

a backend server configured to receive a request for a resource and provide a response to the request; and a network device interposed between a client device and the backend server and configured and arranged to perform actions, including:

receiving a request from a requesting device over the network for access to a resource;

selectively examining the request to determine whether it is associated with a network attack; and     when the request is associated with a network attack, then:

providing a redirection response to the request to redirect the requesting device to a honeypot device that is configured to absorb attacks; and         performing actions directed towards throttling communications with the client device, including:

selectively inducing the requesting device associated with the request to throttle its communications with the network device by selectively sending delayed acknowledgements to requests from the requesting device;

dropping or rejecting packets within the request to force the client device to resend the dropped or rejected packets; and             acknowledging the client device's packets one byte at a time.

15. The system of claim 14, wherein inducing the request device to throttle its communications further comprises sending an acknowledgement at or below a retransmission timeout threshold value.

16. The system of claim 14, wherein inducing the request device to throttle its communications further comprises sending an explicit congestion notification echo to the requesting device.

17. The system of claim 14, wherein selectively examining the request further comprises examining the request for at least one of an invalid cookie, or an improper referrer header.

* * * * *